(12) United States Patent
Tomlinson

(10) Patent No.: US 8,432,527 B2
(45) Date of Patent: Apr. 30, 2013

(54) LIGHT GUIDE DEVICE

(75) Inventor: Andrew Michael Tomlinson, Northumberland (GB)

(73) Assignee: ITI Scotland Limited, Glasgow (GB)

( * ) Notice: Subject to any disclaimer, the term of this patent is extended or adjusted under 35 U.S.C. 154(b) by 225 days.

(21) Appl. No.: 13/120,019

(22) PCT Filed: Sep. 29, 2009

(86) PCT No.: PCT/GB2009/051270
§ 371 (c)(1),
(2), (4) Date: Apr. 11, 2011

(87) PCT Pub. No.: WO2010/035050
PCT Pub. Date: Apr. 1, 2010

(65) Prior Publication Data
US 2011/0182084 A1    Jul. 28, 2011

(30) Foreign Application Priority Data

Sep. 29, 2008 (GB) .................................. 0817829.5

(51) Int. Cl.
*C09K 19/52* (2006.01)
*G02B 6/036* (2006.01)
*F21V 7/22* (2006.01)
*F21V 8/00* (2006.01)
*H01L 33/00* (2010.01)
*H01S 3/00* (2006.01)

(52) U.S. Cl.
USPC .............. 349/166; 349/95; 349/62; 349/57; 385/126; 385/131; 385/14; 362/97.1; 362/97.2; 362/608; 362/551; 362/555; 362/553

(58) Field of Classification Search .................. 385/126, 385/127, 131, 14; 349/56, 57, 62, 95, 112, 349/122, 116, 166; 362/97.1, 97.2, 97.3, 362/97.4, 612, 629, 84, 608, 555, 553
See application file for complete search history.

(56) References Cited

U.S. PATENT DOCUMENTS

| 6,030,108 | A | 2/2000 | Ishiharada et al. ............ 362/562 |
| 7,719,016 | B2 * | 5/2010 | Nada et al. ..................... 257/95 |
| 7,929,816 | B2 * | 4/2011 | Meir et al. ...................... 385/39 |
| 8,182,128 | B2 * | 5/2012 | Meir et al. ..................... 362/612 |
| 8,238,703 | B2 * | 8/2012 | Meir et al. ...................... 385/39 |
| 2006/0056166 | A1 | 3/2006 | Yeo et al. ......................... 362/19 |
| 2006/0187552 | A1 * | 8/2006 | Huang et al. ................... 359/619 |
| 2007/0172171 | A1 | 7/2007 | Van Ostrand et al. .......... 385/31 |
| 2008/0117620 | A1 * | 5/2008 | Hama et al. ...................... 362/84 |
| 2008/0152933 | A1 * | 6/2008 | Mizuno et al. ................ 428/480 |
| 2009/0161341 | A1 * | 6/2009 | Meir et al. ........................ 362/84 |
| 2011/0182084 | A1 * | 7/2011 | Tomlinson ..................... 362/608 |

FOREIGN PATENT DOCUMENTS

| GB | 2 431 730 | 5/2007 |
| WO | WO 96/21122 | 7/1996 |
| WO | WO 2005/101070 | 10/2005 |
| WO | WO 2006/014822 | 2/2006 |

OTHER PUBLICATIONS

Examination Report (Office Action) in GB0817829.5, dated Jun. 28, 2011.
International Search Report (ISR) and Written Opinion (WO) in PCT/GB2009/051270 dated Feb. 23, 2010.
International Preliminary Report on Patentability in PCT/GB2009/051270 dated Sep. 6, 2010.
Search Report under Section 17 in GB0817829.5 dated Feb. 13, 2009.

* cited by examiner

*Primary Examiner* — Brian Healy
(74) *Attorney, Agent, or Firm* — Harness, Dickey & Pierce, P.L.C.; J. Timothy Keane; Kisuk Lee

(57) ABSTRACT

Light guide devices comprising an intermediate layer of low refractive index between higher refractive index elements are described. The light guide devices are suitable for use in backlights.

22 Claims, 5 Drawing Sheets

LIGHT GUIDE DEVICE

CROSS-REFERENCE TO RELATED APPLICATIONS

This application is a national phase application of PCT Application No. PCT/GB2009/051270 filed on Sep. 29, 2009, which claims the benefit and priority to United Kingdom (GB) Patent Application No. 0817829.5 filed Sep. 29, 2008. The entire disclosures of the applications identified in this paragraph are incorporated herein by references.

FIELD OF THE INVENTION

This invention relates to a light guide device. The light guide device is suitable for use in a range of applications, particularly in connection with the backlighting of displays, for example, liquid crystal displays.

BACKGROUND OF THE INVENTION

The angular distribution of light coming from a backlight is important in determining both the efficiency and the viewing angle of the display that it illuminates.

Edge lit backlights guide light from the edge of the light guide to points all over the area of the output of the light guide. Light confined within the guide and propagating within the guiding angle of the guide, may be scattered by scattering structures, such as point like defects, on the surface of the guiding layer. Powdered $TiO_2$ is an example of a suitable scattering material. An illustration of such a system is shown in FIG. 1.

In FIG. 1, LEDs (1) are arranged at the edge of a transparent polymer core light guide layer (2). Light (3) from the LEDs propagates through the light guide layer and is scattered through approximately 90° by scattering structures, e.g. point like defects (4). In the figure shown, the device is viewed from above as indicated; the main light output surface is indicated at (5). Typically, the core layer is unclad, relying on the refractive index contrast between the core and surrounding air to provide the guiding effect. Light scattered out of this type of structure is emitted from the top surface over a full hemisphere of output angles.

In an attempt to improve efficiency, it is known to arrange the scattering structures into small dots and position a microlens of a low refractive index material directly above each dot. The combination of the dot and microlens provides some degree of control over the range of output angles provided by the backlight. However, such a system does not always provide as much control over the range of output angles as may be desired for a particular system. Also, the transmission of the overall system may be reduced as the transmission of the liquid crystal screen positioned in front of the backlight typically may be reduced for light incident away from normal incidence.

It is an objective of the present invention to provide at least alternative, and preferably, improved light guide devices possessing, for example, improved optical efficiency. As such, the present invention is partly based on the finding that the range of angles of light which may be usefully collected from an arrangement such as that described above may be greatly extended by incorporating an intermediate low refractive index layer between higher refractive index elements.

SUMMARY OF THE INVENTION

According to a first aspect of the present invention, there is provided a light guide device comprising:

a core light guide layer sandwiched between the inner surfaces of a first and a second cladding layer;

a plurality of scattering structures located at the interface between the first cladding layer and the core light guide layer and/or at the interface between the second cladding layer and the core light guide layer;

a series of microlenses arranged on an outer layer of the first cladding layer;

wherein the refractive indices of the microlenses and the core light guide layer are greater than the refractive indices of the cladding layers.

According to a further aspect of the present invention, there is provided a display device comprising a light guide device according to the first aspect of the invention. The display device may be a liquid crystal display device and may therefore comprise a liquid crystal cell which may also be referred to as a liquid crystal panel.

The scattering structures serve to deflect light guided in the core light guide layer into non-guided directions. Light guided in the core light guide layer is retained within the light guide device and may include light scattered by the scattering structures but not sufficiently scattered to be emitted from the light guide device. Non-guided directions include light which is scattered by the scattering structures through approximately 90° and emitted by the light guide device.

The outer layer of the first cladding layer on which the series of microlenses is arranged is the main light output surface. In order for light to be scattered through substantially 90°, in a non-guided direction, and in the direction of the main light output surface, a plurality of scattering structures, for example point defects, may be provided on one of the inner surfaces of the first or second cladding layers and/or on one of the surfaces of the core light guide layer sandwiched between the inner surfaces of the first and second cladding layers. Alternatively, or in addition, the scattering structures may be located within the main body of the core light guide layer.

Preferably, each one of the scattering structures has a microlens located directly above it.

The light guide device is arranged to receive light from at least one light source and to at least partly constrain light therein by total internal reflection. In particular, the light guide device is suitable for use as an edge lit light guide device and the device may further comprise one or more light sources along one or more edges of the device.

The cladding layer between the core light guide layer and the microlenses may be referred to as an intermediate layer. The microlenses are preferably directly in contact with the intermediate layer.

If the core light guide layer has a refractive index $n1$, the intermediate layer has index $n2$ and the microlenses have a refractive index $n3$, then the preferred relationship is $n3 \geq n1 > n2$. Preferably the ratio of the refractive indices of $n1$ and $n3$ to $n2$ should be as high as possible. In particular $n3/n2$ should be as high as possible, for example greater than about 1.2.

There are numerous advantages associated with the various aspects of the present invention including: improved optical coupling efficiency into a desired range of output angles; less steep topology to the microlens surface; minimal stray light that may create unwanted peaks in the angular distribution. Improved optical coupling efficiency reduces the amount of input light required and hence the cost of the light sources. The present invention also allows for the output angle to be controlled so the viewing angle can be set accordingly.

DETAILED DESCRIPTION OF THE INVENTION

Light Guide Devices

Light guide devices are employed for a range of functions including illumination, backlighting, signage and display purposes. Typically, the light guide devices are constructed from an injection moulded or cast transparent plastic component, where a light source, such as a fluorescent lamp or a plurality of light emitting diodes (LEDs), is integrated by means of mechanical attachment at the edge of the transparent plastic component. Examples of such devices are described in WO 2005/101070, the contents of which are incorporated herein in their entirety by reference.

Common to all of these devices is the fact that light from the light source is guided through a transparent guide, typically made of plastic, by total internal reflection. For edge-lit backlighting applications, non-guided light is emitted in a substantially perpendicular direction to that of the direction of propagation of the light within the transparent guide. This may be achieved through the light being directed so as to interact with scattering structures, such as point defects or films located within, or on the surface of, the transparent guide. Fluorescent lamps or LEDs may be integrated to the edge of the transparent light guide. Achieving a good coupling is important regarding the optical performance of the device.

The coupling of the LEDS to the light guide layer may be achieved according to a range of techniques. This may be achieved by a butt coupling process where the LEDs are attached to the end of the light guides by uv curing with a high refractive index photonic adhesive that acts to reduce reflections from the ends of the light guide layer. The light guide layer may be hot cleaved or polished to provide a suitable optical surface at the end of the light guide layer which facilitates good coupling of light from the light source into the light guide layer.

Light Source

The light source can be any of those known to those skilled in the art, including those which are suitable for use in backlighting. Such light sources include one or more LEDs, cold cathode fluorescent lamps, laser diodes, organic light emitting diode sources, and other electroluminescent devices. The light may be non-directional. In particular, the light sources are preferably suitable for use in an edge lit arrangement. The LEDs can be any of the designs known to those skilled in the art, including edge-emitting, side emitting, top emitting or bare die LEDs.

Core Light Guide Layer

The core light guide layer may be made from a range of suitable light transmissive polymer materials. Preferably, the core light guide layer should possess a high optical transmission. Suitable materials for the core include transparent polymers such as polymethylmethacylate (PMMA), polystyrene and other optical polymers. The core light guide layer is, depending on the performance required, typically in the range of about 0.5 mm to 4 mm, for example, about 1 mm in thickness. The refractive index of the core light guide layer may be from about 1.4 to about 1.8, for example about 1.5.

Microlenses

Microlenses are small lens, typically possessing a diameter of about 0.5 to 5 mm. In particular, the microlens may comprise hemispheres possessing a diameter of about 2.25 mm. The microlenses may be Fresnel lenses which may have surface features typically of about 0.001 mm to 1 mm in thickness. The refractive index of the microlenses may be about 1.4 to 1.8, for example about 1.6. Suitable materials for the microlenses include polycarbonates, uv curing materials such as a lacquer or an epoxy.

The microlens array may be fabricated as a single sheet which may, for example, be injection moulded or formed by a reel to reel thermal embossing technique, or a uv curing reel to reel technique. The overall thickness of such a sheet may typically be about 0.01 mm to 1 mm.

Cladding Layers

The cladding layers may be made from a range of suitable light transmissive polymer materials. The cladding layers possess lower refractive indices than the core light guide layer and the microlenses. Suitable materials for the cladding layers include transparent polymers such as fluoropolymers.

The cladding layers are typically of the order of about 0.01 mm to 0.3 mm in thickness. The refractive index of the cladding layers may be from about 1.25 to about 1.4, for example about 1.35. A suitable material for the cladding layers is fluorinated ethylene propylene (FEP). Advantageously, the ratio of the thickness of the core light guide layer to the thickness of the intermediate layer is greater than about 5.

Reflector Layer

Light will be scattered in both upward (towards the main light output surface) and downward directions by the scattering structures. It is advantageous to reflect light scattered in the downward directions back in an upward direction using a reflective sheet placed substantially parallel and behind the second cladding layer. The reflective sheet may be attached to the second cladding layer along its main surface. Such a reflective sheet may be made from a metallised polymer film or similar, for example polyethylene terephthalate (PET) possessing a vacuum deposited aluminium layer thereon.

Scattering Structures

In order for light to be scattered through substantially 90°, in a non-guided direction, and in the direction of the main light output surface, a plurality of scattering structures, for example, point defects may be provided on one of the inner surfaces of the first or second cladding layers and/or on one of the surfaces of the core light guide layer sandwiched between the inner surfaces of the first and second cladding layers. Alternatively, or in addition, the scattering structures may be located within the core light guide layer. Preferably the scattering structures are positioned directly in line with the microlenses. The scattering structures may be indents into a surface of the core light guide layer or into a surface of a cladding layer. Alternatively a powder such as $TiO_2$ may be deposited onto a surface of the core light guide layer or a surface of a cladding layer.

Uses of the Light Guide Device

The light guide device according to the present invention may be employed for a range of functions including illumination, backlighting, signage and display purposes.

Liquid crystal devices are well known in the art. A liquid crystal display device operating in a transmissive mode typically comprises a liquid crystal cell, which may also be referred to as a liquid crystal panel, a backlight unit incorporating a light guide device, and one or more polarisers. Liquid crystal cells are also well known devices. In general, liquid crystal cells typically comprise two transparent substrates between which is disposed a layer of liquid crystal material. A liquid crystal display cell may comprise two transparent plates which may be coated on their internal faces respectively with transparent conducting electrodes. An alignment layer may be introduced onto the internal faces of the cell in order that the molecules making up the liquid crystalline material line up in a preferred direction. The transparent plates are separated by a spacer to a suitable distance, for example about 2 microns. The liquid crystal material is introduced between the transparent plates by filling the space in between them by flow filling. Polarisers may be arranged in front of and behind the cell. The backlight unit may be positioned behind the liquid crystal cell using conventional means. In operation, a liquid crystal cell, operating in a transmissive mode, modulates the light from a light source such as a backlight unit which may comprise a light guide device.

BRIEF DESCRIPTION OF THE DRAWINGS

Embodiments of the invention will now be described, by way of example only and without limitation, with reference to the accompanying drawings, in which:

In FIG. 1, LEDs (1) are arranged at the edge of a transparent polymer core light guide layer (2). Light (3) from the LEDs propagates through the light guide layer and is scattered through approximately 90° by scattering structures, such as point like defects, (4) and exits (3a) the light guide layer. In the figure shown the device is viewed from above as indicated; the main light output surface is indicated at (5) and the point like defects (4) are located on the opposite lower surface. The core light guide layer (2) may be clad by sandwiching it between further lower refractive index transparent light guide layers (not shown). A significant proportion of the light which is scattered by the point like defects is not transmitted to the viewer.

FIG. 2 essentially provides a side view of the prior art device illustrated in FIG. 1 with a number of additions. A first (upper) and second (lower) cladding layer are indicated at (6) and (7) respectively and microlenses are indicated at (8). Traditionally, microlenses have been used which have a low refractive index and which have the same refractive index as the cladding layer (6). The core light guide layer (2) is sandwiched between the inner surfaces (6a) and (7a) respectively of the cladding layers (6) and (7). The cladding layers (6) and (7) have a lower refractive index than the core light guide layer (2). A light scatterer is indicated at (4a). A light ray propagating in the arc indicated at (10) is guided, i.e. retained in the light guide at least until it strikes a further scattering structure. If the light ray (or photon) is scattered substantially vertically, or at least within the range of angles indicated at (11), it will exit the guide and emerge from the microlens within the useful range for the display application.

For practical systems, there exists a range of angles between the two ranges discussed (10) and (11). This range is indicated by the arc shown at (12). Light rays or photons which are scattered into the angles represented by (12) may exit the system in an uncontrolled manner. Although some of them may go to usefully illuminate the display, many will not.

Figure 1:
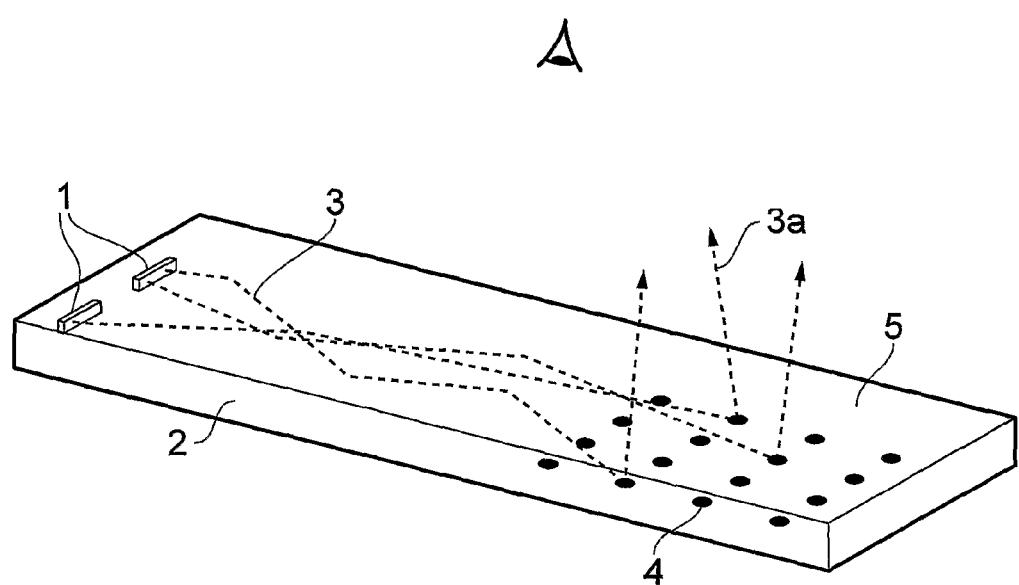
FIG. 1 illustrates a known edge lit light guide device.
Figure 2:
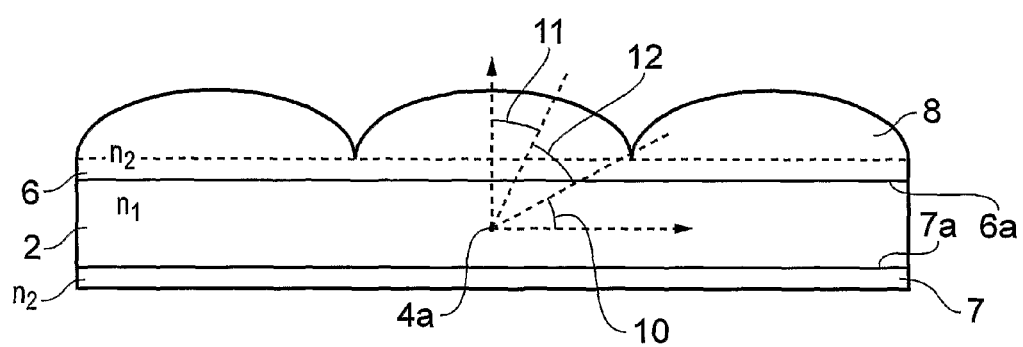
FIG. 2 illustrates a side view of a known light guide device.
Figure 3:
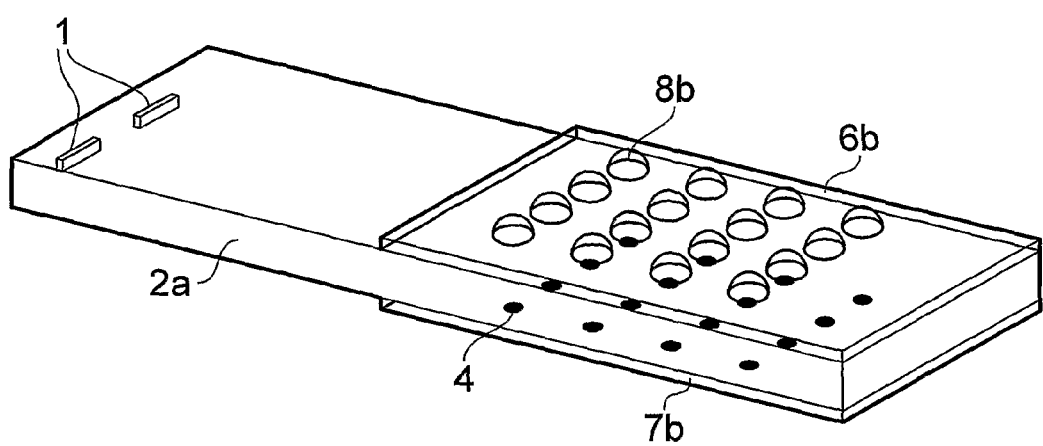
FIG. 3 illustrates an edge lit light guide device according to the present invention.
Figure 4:
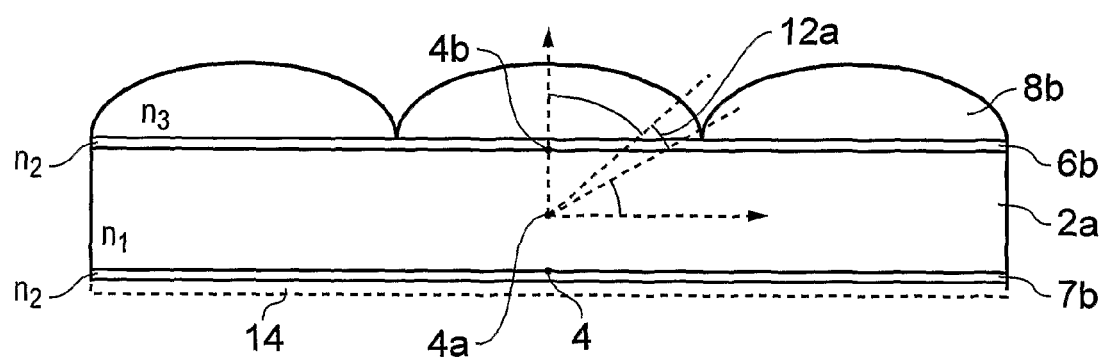
FIG. 4 illustrates a side view of a light guide device according to the present invention.

FIG. 3 illustrates an arrangement in accordance with the present invention and FIG. 4 is essentially a side view of such an arrangement. In FIGS. 3 and 4, the light guide device has been modified by reducing the cladding layers (6) and (7) from FIG. 2 in thickness. In FIG. 3, these upper and lower cladding layers are indicated as layers (6b) and (7b) respectively. Optionally, a reflector layer (14) may be positioned behind or attached to the second cladding layer (7b). The cladding layers (6b) and (7b) have been reduced in thickness compared with cladding layers (6) and (7) such that the ratio of the core light guide layer (2a) to the thickness of the cladding layers (6b) and (7b) is greater. Also, the microlenses (8b) are formed in a material with a higher refractive index than the cladding layers (6b) and (7b). The microlenses (8b) may now typically be made from the same high refractive material as the core light guide layer (2), though they will possess a higher refractive index than the cladding layers. The range of light angles which is collected is greatly extended due mainly to the increase in the ray angle as it refracts from the thin layer of low index material (6b) into the high index layer of the microlenses (8b). The range of angles which may be lost as indicated by the arc (12) in FIG. 2 is almost eliminated and is indicated at (12a) in FIG. 4. Hence the optical efficiency of the new system according to the present invention is significantly higher. Scattering structures are also shown at (4) and (4b) in FIG. 4.

EXAMPLES

The invention will now be described by way of example only with reference to the following examples.

Example 1

A regular dot pattern (scattering features) was printed onto a PMMA sheet (core light guide layer) using screen printing ink impregnated with $TiO_2$ particles. Cladding layers made from FEP were laminated onto either side of the core using a pressure sensitive adhesive. Along the exposed main surface of one of the cladding layers, an aluminium coated FEP layer was attached (reflector layer), also using pressure sensitive adhesive. On the exposed main surface of the other cladding layer, an array of individual injection-moulded, hemispherical polystyrene microlenses was attached directly above and in line with the scattering features using a uv-curing adhesive. The device was illuminated from the side.

Figure 5:
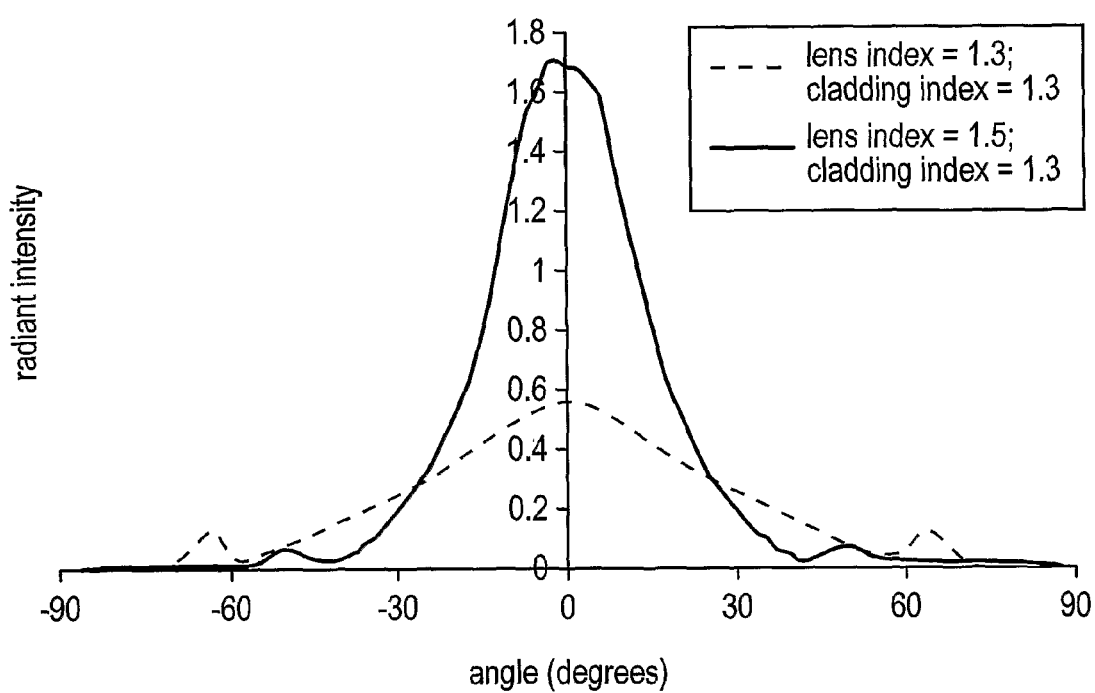
FIG. 5 is a plot of radiant intensity versus angle of light emitted for a device according to the present invention and a comparative device.

A calculation was performed using Zemax ray tracing software on two systems (a) $n1=n3=1.5$ and $n2=1.3$ and (b, comparative) $n2=n3=1.3$ and $n1=1.5$. The difference in output distributions is shown in FIG. 5. The distribution of light for the arrangement according to the present invention is significantly more concentrated to angles close to zero degrees (i.e. emitted perpendicular to the surface) which for many back light systems is the ideal case Discussion The combination of a thin low refractive index intermediate layer and high refractive index microlenses provides increased radiant energy over a controlled i.e. narrower range of angles. The device according to the present invention also allows for the capture of a wide range of incident angles thus increasing the optical efficiency.

The invention claimed is:
1. A light guide device comprising:
a core light guide layer sandwiched between inner surfaces of a first and a second cladding layer;
a plurality of scattering structures located at an interface between the first cladding layer and the core light guide layer, and/or at an interface between the second cladding layer and the core light guide layer and/or within the core light guide layer;
a series of microlenses arranged on an outer surface of the first cladding layer;

wherein the refractive indices of the microlenses and the core light guide layer are greater than the refractive indices of the cladding layers.

2. The light guide device according to claim 1, wherein the plurality of scattering structures are located at the interface between the first cladding layer and the core light guide layer and/or at the interface between the second cladding layer and the core light guide layer.

3. The light guide device according to claim 1, wherein each one of the scattering structures has a microlens located directly above the scattering structure.

4. The light guide device according to claim 1, wherein the refractive indices of the microlenses and the core light guide layer are substantially the same.

5. The light guide device according to claim 1, wherein the refractive indices of the microlenses and the core light guide layer are from about 1.4 to about 1.8 and the refractive index of the first and second cladding layers are from about 1.25 to about 1.4.

6. The light guide device according to claim 1, wherein the ratio of the refractive indices of the microlenses to the refractive indices of the cladding layers is greater than about 1.2.

7. The light guide device according to claim 1, wherein the thickness of the core light guide layer is from about 0.5 mm to about 4 mm.

8. The light guide device according to claim 1, wherein the thickness of the cladding layers is from about 0.01 mm to about 0.3 mm.

9. The light guide device according to claim 1, wherein the core light guide layer is made from transparent polymer.

10. The light guide device according to claim 9, wherein the core is made from polymethylmethacylate (PMMA).

11. The light guide device according to claim 1, wherein the first and second cladding layers are made from transparent polymer.

12. The light guide device according to claim 1, wherein the microlenses possess a diameter of about 0.5 to 5 mm.

13. The light guide device according to claim 1, wherein the microlenses are Fresnel lenses.

14. The light guide device according to claim 13, wherein the Fresnel lenses possess surface features of about 0.001 mm to 1 mm in thickness.

15. The light guide device according to claim 1, wherein the microlenses are made from polycarbonate or a UV curing material.

16. The light guide device according to claim 1, further comprising a reflector layer attached to an outer surface of the second cladding layer.

17. The light guide device according to claim 1, wherein the light guide device further comprises one or more light sources to form an edge-lit light guide device.

18. The light guide device according to claim 17, wherein the one or more light sources are selected from LEDs, cold cathode fluorescent lamps, laser diodes, organic light emitting diode sources, and other electroluminescent devices.

19. The light guide device according to claim 18, wherein the one or more light sources are LEDs selected from edge-emitting, side emitting, top emitting and bare die LEDs.

20. The light guide device according to claim 17, wherein the one or more light sources are butt coupled to the light guide device.

21. The display device comprising the light guide device according to claim 1.

22. The display device according to claim 21, wherein the display device is a liquid crystal device.

\* \* \* \* \*